United States Patent [19]
Hikmet

[11] Patent Number: 6,014,197
[45] Date of Patent: Jan. 11, 2000

[54] ELECTRO-OPTICAL DEVICE WHEREIN ORIENTATION LAYERS HAVE GRATING STRUCTURE AND COMPRISES BIREFRINGENT MATERIAL WITH REFRACTIVE INDICES EQUAL TO ELECTRO-OPTIC MEDIUM

[75] Inventor: Rifat A. M. Hikmet, Eindhoven, Netherlands

[73] Assignee: U.S. Philips Corporation, New York, N.Y.

[21] Appl. No.: 08/732,240

[22] PCT Filed: Feb. 27, 1996

[86] PCT No.: PCT/IB96/00148

§ 371 Date: Oct. 25, 1996

§ 102(e) Date: Oct. 25, 1996

[87] PCT Pub. No.: WO96/27148

PCT Pub. Date: Sep. 6, 1996

[30] Foreign Application Priority Data

Feb. 28, 1995 [EP] European Pat. Off. ............. 95200492

[51] Int. Cl.[7] .................... G02F 1/13; G02F 1/1337
[52] U.S. Cl. .................... 349/201; 349/123; 349/124; 349/202
[58] Field of Search ................. 349/123, 124, 349/201, 202

[56] References Cited

U.S. PATENT DOCUMENTS

| | | |
|---|---|---|
| 4,251,137 | 2/1981 | Knop et al. ............... 349/201 |
| 4,331,972 | 5/1982 | Rajchman ................ 358/60 |
| 4,729,640 | 3/1988 | Sakata .................... 349/201 |
| 4,729,641 | 3/1988 | Matsuoka et al. ........ 349/201 |
| 4,850,681 | 7/1989 | Yamanobe et al. ....... 350/348 |
| 4,850,682 | 7/1989 | Gerritsen ................ 350/348 |
| 4,856,869 | 8/1989 | Sakata et al. ............ 349/201 |
| 4,904,063 | 2/1990 | Okada et al. ............ 349/200 |
| 4,973,163 | 11/1990 | Sakai et al. ............ 356/367 |
| 5,013,141 | 5/1991 | Sakata .................... 349/201 |
| 5,194,975 | 3/1993 | Akatsuka et al. ........ 359/73 |
| 5,237,435 | 8/1993 | Kurematsu et al. ...... 359/41 |
| 5,262,882 | 11/1993 | Hikmet .................. 359/75 |
| 5,299,037 | 3/1994 | Sakata .................... 349/201 |
| 5,299,289 | 3/1994 | Omae et al. ............ 359/95 |
| 5,438,421 | 8/1995 | Sugawara et al. ....... 349/123 |
| 5,486,403 | 1/1996 | Ishitaka et al. ......... 349/123 |
| 5,552,916 | 9/1996 | O'callaghan et al. ... 349/124 |
| 5,694,247 | 12/1997 | Ophey et al. ........... 359/566 |
| 5,900,977 | 5/1999 | Hikmet .................. 359/497 |

Primary Examiner—William L. Sikes
Assistant Examiner—Tarifur R. Chowdhury
Attorney, Agent, or Firm—John C. Fox

[57] ABSTRACT

Switchable electro-optic medium (2) between two substrates (3, 4) at least one of which carries a grating structure (7, 8) at the side of the electro-optic medium, which grating structure has refractive indices which are substantially identical to those of the medium in the non-isotropic state. In the isotropic state diffraction occurs at the grating structure due to a difference in refractive index so that the central beam (11) decreases in intensity. Based on this principle, light shutters for, for example projection display but also beam splitters, colour selectors and beam deflectors may be realized.

20 Claims, 8 Drawing Sheets

ELECTRO-OPTICAL DEVICE WHEREIN ORIENTATION LAYERS HAVE GRATING STRUCTURE AND COMPRISES BIREFRINGENT MATERIAL WITH REFRACTIVE INDICES EQUAL TO ELECTRO-OPTIC MEDIUM

BACKGROUND OF THE INVENTION

The invention relates to a device for controlling a beam of electro-magnetic radiation comprising two composed elements and an electro-optic medium between these elements, each of the elements successively comprising a substrate layer, an electrode layer and an orientation layer, each of the orientation layers facing the electro-optic medium and the electro-optic medium being switchable between at least two states. The invention also relates to an image display panel. Such panel may be used in a direct view display apparatus or in an image projection apparatus, for example for video applications, or as a monitor. The device of the invention may also be used in a wavelength selector or in a beam direction controller.

A device as mentioned in the opening paragraph is described in U.S. Pat. No. 5,262,882. In this patent, a liquid crystal cell is shown with orientation layers of an oriented polymer comprising liquid crystal material. Due to the strong interaction between the orientation layer and the switchable liquid crystalline material, the latter is oriented in the direction of orientation of the oriented polymer.

If such a cell is used in a display or shutter application, it is usually placed between two mutually crossed polarizers. The first polarizer transmits one of the polarization components of the incident visible radiation and absorbs the other polarization component. Dependent on the voltage across the cell the polarization direction of the transmitted component is more or less rotated and partly or entirely transmitted by the second polarizer. The radiation which is not transmitted by the second polarizer is absorbed by this polarizer. Moreover, radiation losses due to reflections at the polarizers surfaces may occur so that considerably more than 50% of the radiation incident on the first polarizer is lost.

OBJECTS AND SUMMARY OF THE INVENTION

It is, inter alia, an object of the present invention to provide a device of the type described above for use in an image display apparatus such that the said drawbacks are entirely or partly obviated. To this end the device according to the invention is characterized in that at least one of the orientation layers has a linear periodic surface profile of alternating higher and lower strip-shaped surface portions and comprises a birefringent material having refractive indices which are substantially equal to those of the electro-optic medium in one of the states.

In the latter state, at the interface of the orientation layer and the electro-optic medium, for example a liquid crystalline medium, no change in refractive indices occur, so that an incident visible radiation beam does not "see" the surface profile and is not influenced thereby. If, the electro-optic medium is in one of the other states the surface profile of an orientation layer influences the extraordinary beam component, i.e. the component having the direction of polarization parallel to the length direction of the strip-shaped surface portions, whereas the ordinary beam component, i.e. the component having the direction of polarization transverse to said length direction is passed unhindered. In this way one of the polarization components of a beam incident on the device can be controlled.

A preferred embodiment of the device which enables the two polarization components to be controlled is characterized in that the second orientation layer has a linear periodic surface profile of alternating higher and lower strip-shaped surface portions and comprises a birefringent material having refractive indices which are substantially equal to those of the electro-optic medium in said one of the states, and in that the length direction of the surface portions of the second orientation layer is substantially different from said length direction of the first orientation layer.

The extraordinary beam component is substantially entirely transmitted due to the second surface profile at the other side of the electro-optic medium, and also dependent on the mutual angle between the lengths directions of the profiles, while the ordinary beam component is now influenced by the second surface profile.

The electro-optic medium to be used in the device of the invention may be of different kinds. A first embodiment of the device is characterized in that the electro-optic medium is switchable between two states, one of which is substantially optically isotropic, and in that the refractive indices of the material of a profiled orientation layer are substantially equal to those of the electro-optic medium in the other state.

A second embodiment of the device wherein both orientation layers have a linear periodic surface profile, is characterized in that the electro-optic medium is a twisted nematic liquid crystal structure, and in that the length directions of the surface portions of the two orientation layers cross each other at an angle which is substantially equal to the twist angle of the twisted nematic liquid crystal structure.

A third embodiment of the device is characterized in that the electro-optic medium is switchable between at least two birefringent states, the refractive indices of the material of a profiled orientation layer being substantially equal to those of the electro-optic material in one of the birefringent states.

The said electro-optic medium may comprises a ferroelectric, a ferri-electric or an electroclinic liquid crystal.

Alternatively the medium may be present in the form of a gel. The medium preferably switches between a state in which the molecules in the proximity of the profiled surface are substantially parallel to the length direction of the surface facets, and a state in which the molecules are substantially transverse to said length direction.

A further embodiment of the device is characterized in that a profiled orientation layer comprises an oriented polymer network which comprises a liquid crystal material.

Also with respect to the shape of the surface profile the device of the invention may have different embodiments.

A first embodiment is characterized in that a surface profile is constituted by a phase diffraction grating and in that the electrode layers of the composed elements are connected to drive means.

To obtain grating structures whose materials have refractive indices which are substantially identical to those of the electro-optical medium in one of the states, a grating structure comprising an oriented polymer network in which a liquid crystal material is present is preferably used. The period of such a grating structure is preferably at least 0.1 $\mu$m so as to avoid difficult photolithographic process steps. It has been found that at a period which is shorter than 0.5 $\mu$m. Parts of the orientation layer sometimes do not get in satisfactory contact or in any contact at all with the rubbing means (cloth or rubbing roll) during rubbing. On the other hand, said period is preferably smaller than, for example the size of a pixel of a display panel (100 $\mu$m in practice).

If the device is further characterized in that the drive means are constituted by a source of constant voltage and a switch, it can be used an intensity switch.

If there is no voltage applied across the electrodes, the radiation beam does not see a grating structure at the interface between the electro-optical material and the orientation layer and the beam passes unhindered through this interface. If there is a voltage applied, the radiation beam is diffracted at the interface and splitted up in a zero order beam and higher order diffracted beams, so that the intensity of the central, or zero order, beam is reduced.

If each of the orientation layers have a profiled surface the two polarization components can be controlled in this way.

The invention may be used in an image display panel. Such panel comprises the device as described above and is further characterized in that each of the electrode layers comprises a linear array of strip shaped electrodes for receiving image data- and selection voltages determining the transmissiveness of electro-optical medium portions defined by the electrode structures of the two electrode layers.

This device replaces a conventional display panel and the two polarizers and has the additional advantage that substantially no radiation is absorbed.

The invention also relates to a direct view image display apparatus which comprises an illumination unit, an image display panel and drive means for the panel. This apparatus is characterized in that the image display panel is a panel as described above.

This apparatus may be further characterized in that, at the viewer's side, at least a part of the grating has a variable period.

Alternatively this apparatus may be characterized in that, at the viewer's side, at least a part of the grating has a Fresnel structure.

The invention also relates to an image projection apparatus. This apparatus which comprises, in this order, an illumination system, an image display panel, drive means for this panel and a projection lens, is characterized in that the display panel is a panel as described above, and in that the objective lens is arranged in only the path of the zero order beam from the display panel.

The invention further relates to a wavelength selection device. This device is characterized in that it comprises a device as described above and in that a surface profile of an orientation layer is constituted by a phase diffraction grating and the electrode layers are connected to a controllable voltage source.

Thereby use is made of the fact that the wavelength of the central, or zero order, beam passed by the grating structure depends on the voltage applied across the electrode layers.

The wavelength selection device may be further characterized that it comprises two orientation layers with a linear periodic surface profile wherein the length direction of the surface portions of one layer is substantially perpendicular to that of the other layer.

With this device the wavelength of both polarization components can be controlled.

The invention is also applicable in a beam direction control device. This control device is characterized in that the surface profile is a sawtooth profile and in that the electrode layers are connected to a source of constant voltage via a switch.

If a voltage is applied across the electrode layers the refractive indices of the electro-optic medium are different from that of the orientation layer so that the sawtooth profile becomes effective and deflects one of the polarization components. In this way the radiation energy of an incident beam can be distributed over two spatially separated subbeams.

If the beam direction control device is further characterized in that both orientation layers have a sawtooth profile both polarization components of the beam can be controlled simultaneously.

BRIEF DESCRIPTION OF THE DRAWINGS

The above and other aspects of the invention will be apparent from and elucidated with reference to the embodiments described hereinafter.

In the drawings.

DESCRIPTION OF THE PREFERRED EMBODIMENTS

Figure 1A:
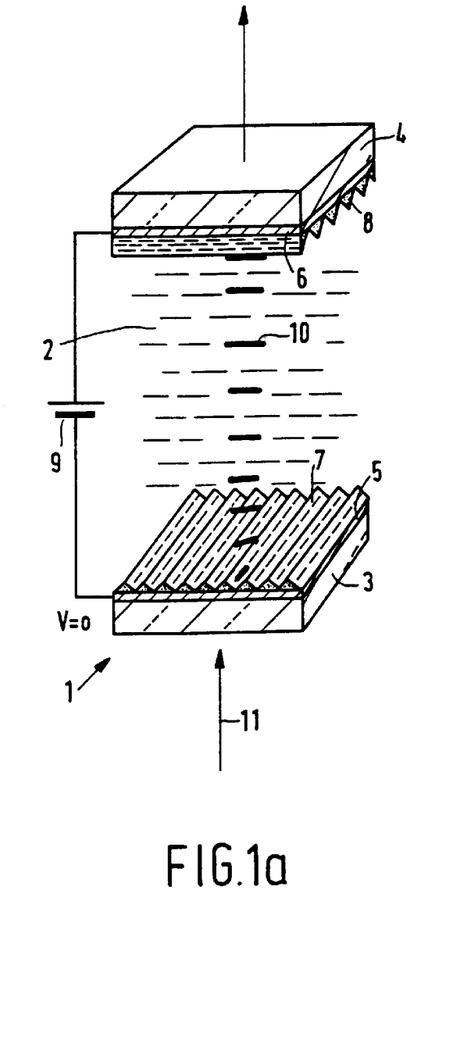
FIGS. 1a and 1b show a first embodiment of a device according to the invention in two different states.
Figure 1B:
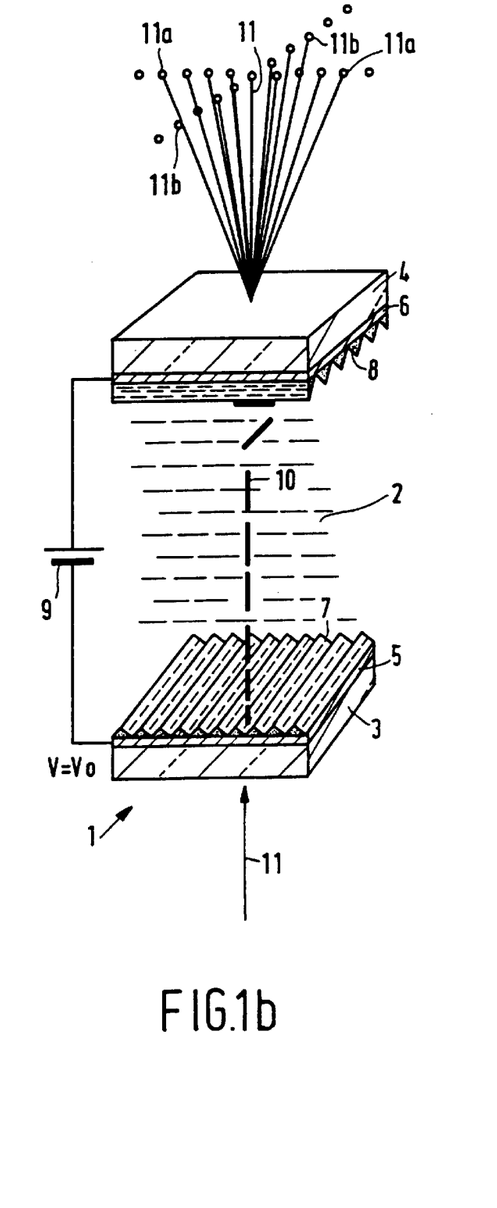

FIGS. 1a and 1b show diagrammatically and partly in cross-section and partly broken away, a part of a liquid crystal device comprising a liquid crystal cell 1 with a twisted nematic liquid crystal material 2 between two composed elements, each comprising a transparent substrate layer 3, 4 of, for example glass or transparent plastics, an electrode layer 5, 6 and an orientation layer 7, 8. The layers 7, 8 orient the liquid crystal material at the inner surfaces of the composed elements. According to the invention, in this embodiment the inner surfaces are implemented as grating structures.

The orientation layers are oriented by means of the technique described in U.S. Pat. No. 5,262,882 or by means of rubbing in the direction of the grooves in the grating structures so that the cell has a twist angle of 90° in this embodiment. In this case, the liquid crystal material has a positive optical anisotropy and a positive dielectric anisotropy. If the electrode layers are energized with an electric voltage Vo from a voltage source 9, the molecules and hence the directors 10 direct themselves to the field, as shown in FIG. 1b.

According to the invention, the material of the grating structure has the same refractive indices $n_e$ and $n_o$ for the extraordinary and the ordinary component of an incident beam 11 as the liquid crystal medium 2. At a voltage V=0 at the electrode layers 5, 6, shown in FIG. 1a, the molecules in the layer 7 and the medium 2 are oriented in such a way that at the interface of the layer 7 and the medium 2 does not occur a change in refractive indices for the extraordinary and the ordinary component of the incident beam 11. Since the beam is not subjected to any change of refractive index, it passes unhindered the interface. The same applies to the interface between the medium 2 and the layer 8 which also has a grating structure whose material has the same refractive indices $n_e$ and $n_o$ for the extraordinary and the ordinary component of the incident beam as the liquid crystal medium 2.

However, if a voltage V=Vo is supplied to the electrodes 5, 6, as shown in FIG. 1b, the molecules in the layer 7 and the medium 2 are arranged in such a hay that a difference in refractive index occurs for the extraordinary component, but not for the ordinary component, of the incident beam 11 at the interface of the layer 7 and the medium 2. The ordinary beam component will therefore not be influenced on its path through the medium. The extraordinary beam component undergoes the effect of the grating and is diffracted thereby perpendicularly to the direction of the grating strips. Since the grating structure of the layer 8 is rotated 90° with respect to that of the layer 7, at the interface of the medium 2 and the layer 8 a refractive index difference occurs for the undiffracted ordinary beam component but not for the diffracted parts of the extraordinary beam component. These diffracted parts will now be able to pass unhindered through the transition between the medium 2 and the layer 8. The ordinary beam component now undergoes the effect of the grating structure and is diffracted thereby in a direction transverse to that at which the extraordinary beam component was diffracted. For a narrow beam 11 this means that first, at the interface of the layer 7 and the medium 2, the extraordinary component is diffracted in a plane transverse to the direction of the grooves of the grating structure 7 and subsequently, at the interface of the medium 2 and the layer 8, the ordinary beam component is diffracted in a plane transverse to the grooves of the grating structure 8. The result is that the radiation energy of the incident beam is divided into a number of subbeams of higher diffraction orders which are arranged in a cross-shaped pattern, as indicated by the subbeams 11a and 11b in FIG. 1b. Thus the central, or zero order, beam 11 is substantially extinguished if a voltage V=Vo is supplied over the electrodes, whereas this beam passes substantially unattenuated through the device if no voltage is supplied to the electrodes. The device thus functions as an intensity switch, or an intensity modulator if different voltages are successively supplied to the device electrodes.

Figure 2:
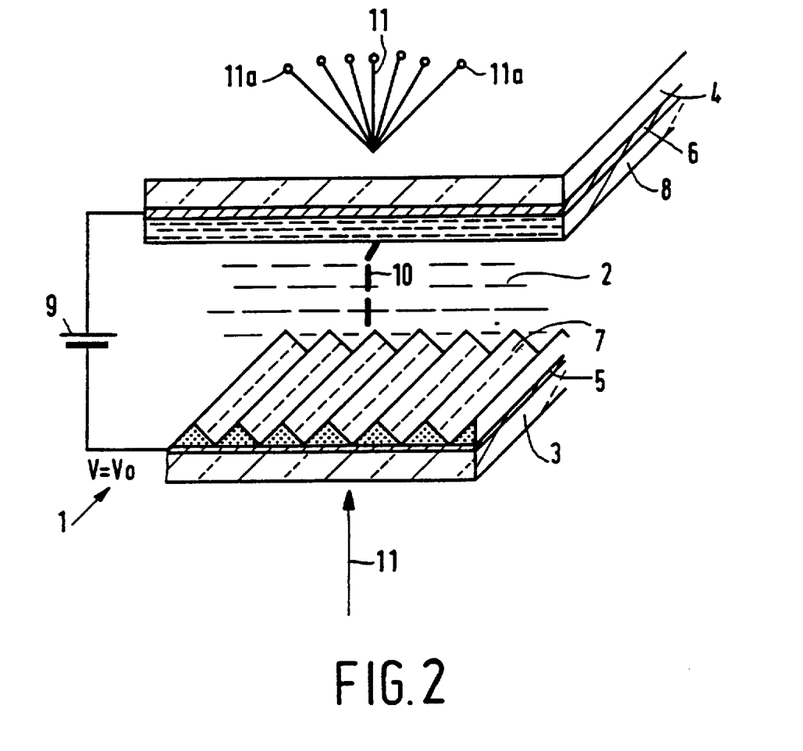
FIG. 2 shows a second embodiment of the device.
Figure 3:
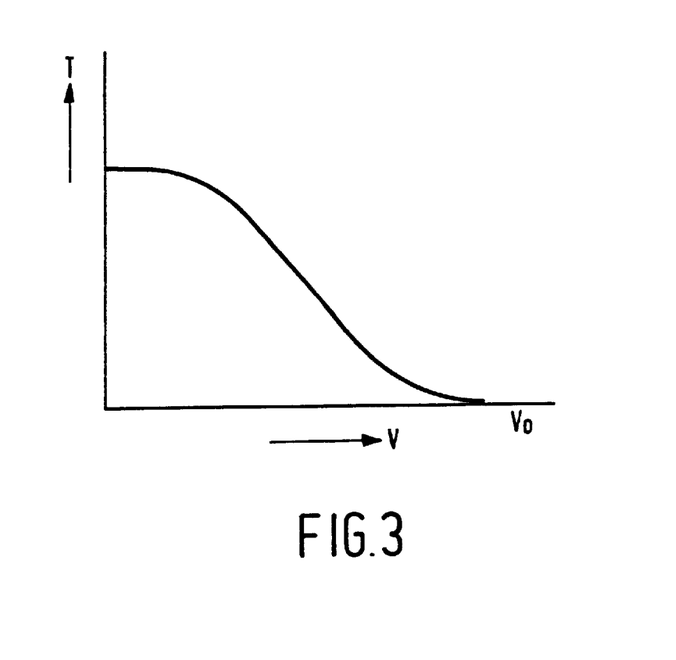
FIG. 3 shows an associated transmission-voltage curve.

FIG. 2 shows an embodiment of the device wherein the orientation layer has a flat inner surface instead of a grating-shaped surface. The ordinary beam component is now not diffracted at the interface of the liquid crystal medium 2 and the orientation layer 8. The emergent beam is now divided into a number of subbeams which are arranged in a line-shaped pattern, as indicated by the subbeams 11a and 11b in FIG. 2. Since the incident beam is diffracted in only one direction, the exiting beam is not completely extinguished at voltage V=Vo. The exiting beam is a linear polarized beam with the polarization direction in a plane transverse to grating structure and parallel to the grooves. The device functions as a polarizer which diffracts the unwanted polarization component instead of absorbing it. If this device is combined with a polarizer having the polarization direction transverse to that of the exiting beam, a similar transmission-voltage curve as that shown in FIG. 3 can be obtained.

A grating structure as described above can be obtained by means of replication techniques, known per se. Thereby use can be made of, for example a mechanically formed mould of, for example polyethylene oxide having a periodical triangular structure. The triangles have a height of, for example 6 $\mu$m, while their basic dimension is approximately 4 $\mu$m. A great variation is possible in the period of the grating structure. A glass substrate provided with electrodes was coated with an orientation layer which was subsequently rubbed uniaxially. A mixture comprising 10% of LC diacrylate ($C_6M$) and 90% of liquid crystal material, and 1% of UV initiator was provided between the mould and the substrate, with the grating grooves being chosen parallel to the direction of orientation. After polymerization with UV radiation, the mould was removed. An optical analysis revealed that the orientation of the molecules in the replica layer was parallel to that of the grating grooves. By means of two structures of this type, a cell as shown in FIG. 1a was composed and filled with such a liquid crystal material that the layer with the grating structure and the liquid crystal material had substantially the same refractive indices.

The electro-optic medium 2 does not necessarily have to be a twisted nematic liquid crystal as in the embodiments described above. Instead, a birefringent medium can be chosen, such as an (anti-)ferro-electric or ferri-electric liquid crystal medium, or an STN cell. The material of the layer with the grating structure is always chosen to be such that in one of the states, for example the voltageless state, this material has the same refractive indices $n_e$ and $n_o$, for the extraordinary and the ordinary component respectively of an incident beam 11, as the electro-optic medium 2, while in the other states a difference in refractive index occurs for one of the components.

Figure 4A:
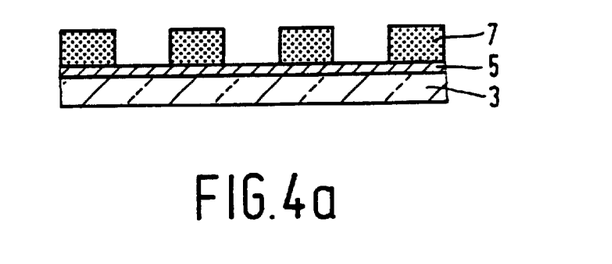
FIG. 4 shows some variations of the grating structure used in these devices.
Figure 4B:
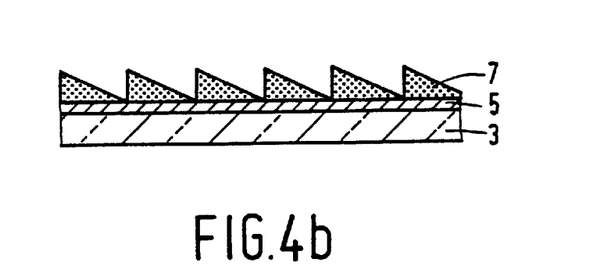
Figure 4C:
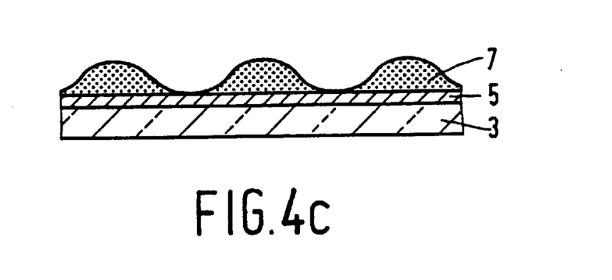
Figure 4D:
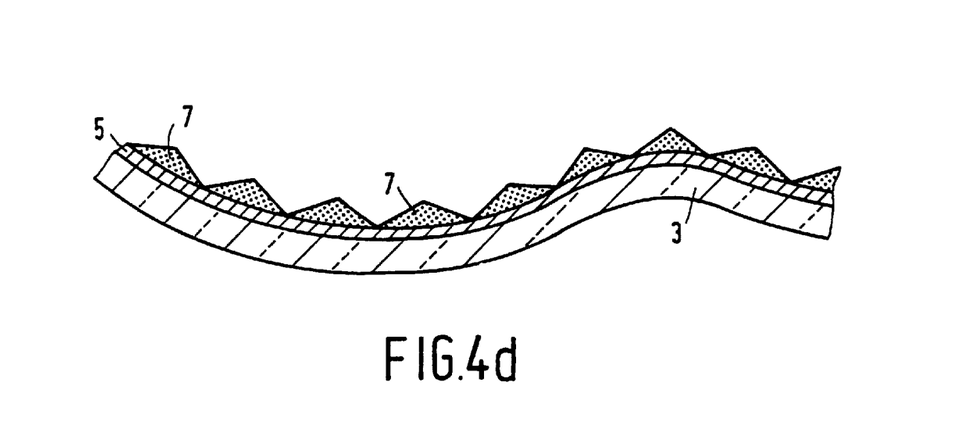

The grating structure does not need to have the triangular shape which is shown in FIGS. 1, 2. For example, FIGS. 4a, 4b and 4c show a number of possible variations in which the layer 7 comprising the grating structure has a square-shaped profile, a sawtooth-shaped profile and a sine or wave-shaped profile respectively. As is shown in FIG. 4d, the profile structure may also be constituted by a wave-shaped pattern provided in the substrate layer 3. The orientation layer 7, which has the same structure, may then be provided or not provided with a triangular-, or other, shaped structure having the same refractive indices $n_e$ and $n_o$, for the extraordinary and ordinary component respectively of the incident beam 11, as the electro-optical medium 2.

Figure 5:
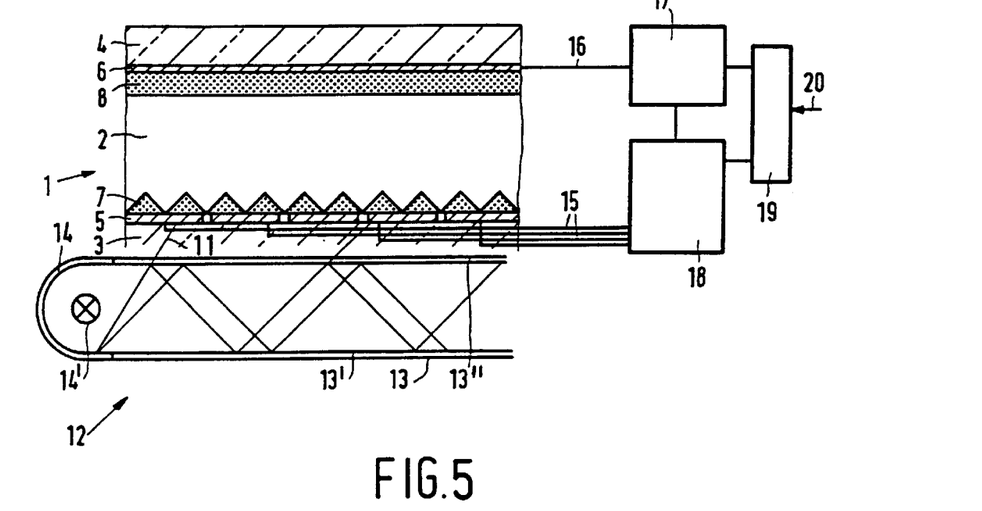
FIG. 5 shows a direct view display apparatus according to the invention.

FIG. 5 shows a direct view image display apparatus comprising a device as described above. The transparent electrodes are now divided into strip-shaped electrodes 5, 6, whose directions enclose an angle of, for example 90°. These electrodes define picture elements, or pixels, at the areas of their mutual crossings such that the device can now be used as a display panel. The new display panel is driven in a way similar to those known for conventional display panels. Via drive lines 15 and 16, the strip shaped electrodes 5, 6 are given data and selection voltages which are generated, for example by a data register 18 and a multiplexer 17. The mutual synchronization is ensured by a control circuit 19 in which incoming signals 20 are also adapted, if necessary.

The display apparatus further comprises an illumination unit 12, comprising a lamp housing 14 which accommodates a lamp 14' and a light guide 13 which runs into the lamp house 14. The design is such that light from the lamp 14' that is incident on the walls 13', 13" is one or more times totally internally reflected by these walls until it is incident on the wall 13" at an angle smaller than the critical angle, so that it is transmitted towards the device 1. The illumination beam from the unit 12 is divided by the pixel structure into a number of subbeams, equal to the number of pixels. Dependent on the applied voltage to a given pixel, the zero order component of the associated subbeam is extinguished or not, which means that the subbeam is not passed or passed in the viewing direction of a viewer who, in the embodiment of FIG. 5 finds himself above the device 1. In this way this subbeam and all other subbeams contribute to the formation of an image.

To prevent too much dispersion of the image light at the viewer's side or to direct the image beam in a wanted direction, it may be desirable to provide one or both grating structured, preferably that at the viewer's side with a variable grating structure or a collimating Fresnel structure.

Figure 6:
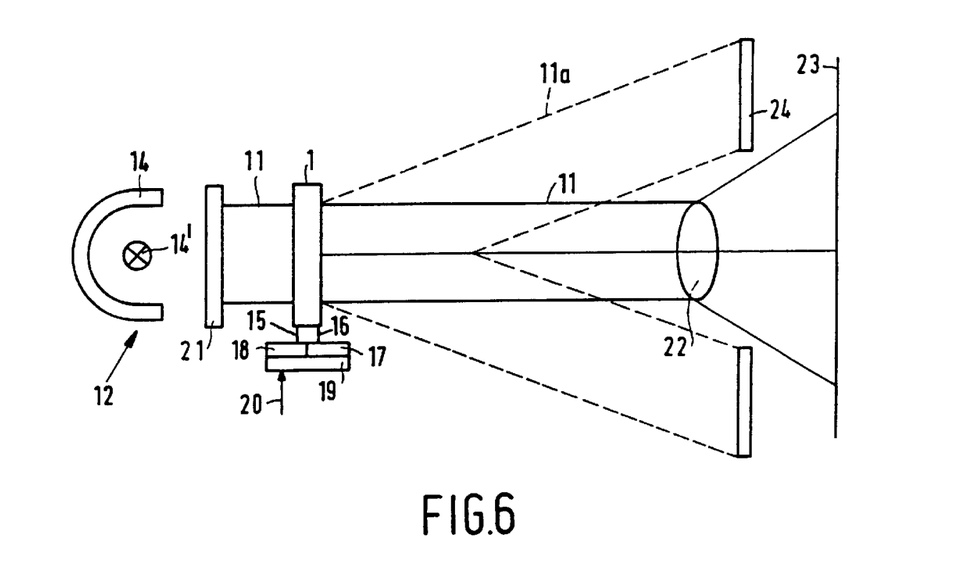
FIG. 6 shows a projection display apparatus according to the invention.

FIG. 6 shows, very schematically, an image projection apparatus provided with a device 1 according to the present invention. The illumination unit 12 comprises a lamp 14' accommodated in a reflective lampholder 14 and additional lens means 21 which may include a collimator lens, so that the illumination beam 11 is a collimated beam. The illumination unit may be constructed, for example as shown in U.S. Pat. Nos. 5,098,184 and 5,184,248. The device 1 is provided with drive means similar to those shown in FIG. 5 and functions as a display panel in the same way as described with reference to FIG. 5. The image generated by the pixels of the device 1, which pixels are switched between lighter and darker states is projected by a projectionlens system 22 on a projection screen 23. To prevent diffracted, i.e. non-zero order, subbeams from reaching the projection screen, light blocking means 24 are incorporated in the housing of the projection apparatus.

As described so far, the invention relates to a switchable electro-optical medium between two composed elements. at least one of which has a grating structure at the side of the electro-optical medium, with the refractive indices of this structure being substantially identical to those of the medium in the non-isotropic state. In the isotropic state the grating structure becomes effective, due to the difference in refractive index, so that the intensity of the central, or zero order, beam component decreases. Based on this principle, light shutters for, for example image projection but also light attenuators and polarizers may be realized.

Figure 7:
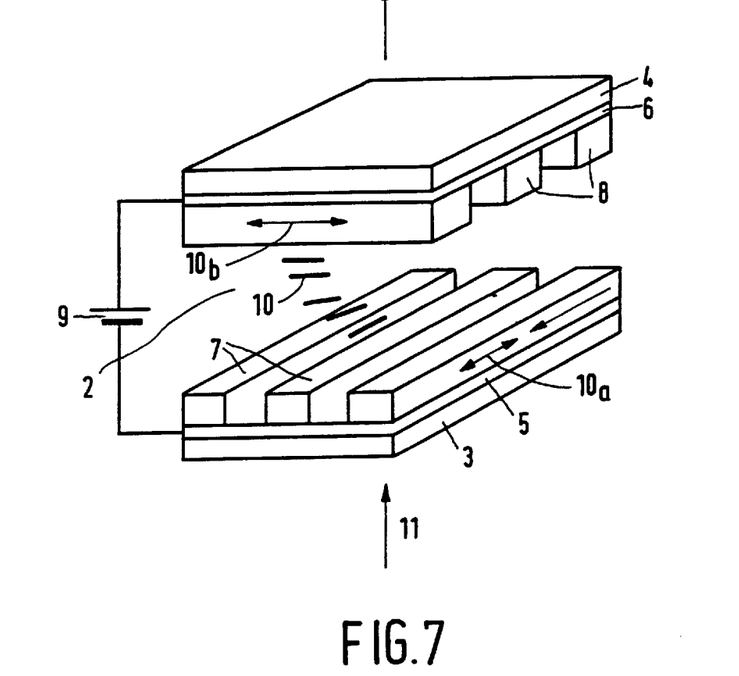
FIG. 7 shows an embodiment of a colour selection device according to the present invention.

A similar device with the double grating structure shown in FIGS. 1, 2 and 4 can also be used as a colour selection device. Such device is shown in FIG. 7. In this device use is made of the fact that for a phase grating having rectangular grooves the transmittance T for the zero order beam, which transmittance is given by $$T(\lambda) = \cos^2(\pi.\Delta n.d/\lambda) \qquad (1)$$

is dependent on the wavelength $\lambda$. In equation (1)

$$\Delta n = n - n'$$

wherein n is the refractive index of the grating material and n' the refractive index of the medium in the grating grooves, i.e. that of the electro-optic medium. As shown in FIG. 7, two of such gratings are arranged such that their grating grooves, and thus the directors (or molecular orientations) 10a and 10b of the grating material are at 90°. In this, twisted, state the refractive indices of the electro-optic medium in the neighbourhood of the gratings are matched to those of the grating material, so that the gratings are not effective and no diffraction occurs.

If electric voltage is applied to the electrodes 5, 6 however the molecules of the medium 2 rotate to make an angle $\theta$ with respect to the normal to the surface of the gratings and the effective extraordinary refractive index $n_e$ (eff) for normal incidence decreases according to:

$$n_e(\textit{eff}) = \frac{n_e n_o}{(n_e^2 \sin^2\theta + n_o^2 \cos^2\theta)^{0.5}} \qquad (2)$$

while the ordinary refractive index remains the same.

Figure 8:
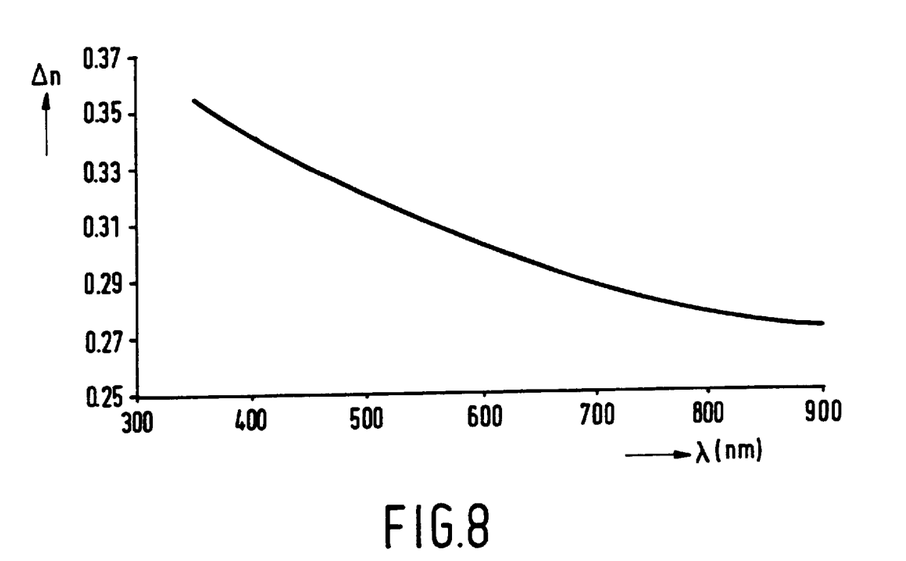
FIG. 8 shows an associated refractive index difference versus wavelength curve.
Figure 9:
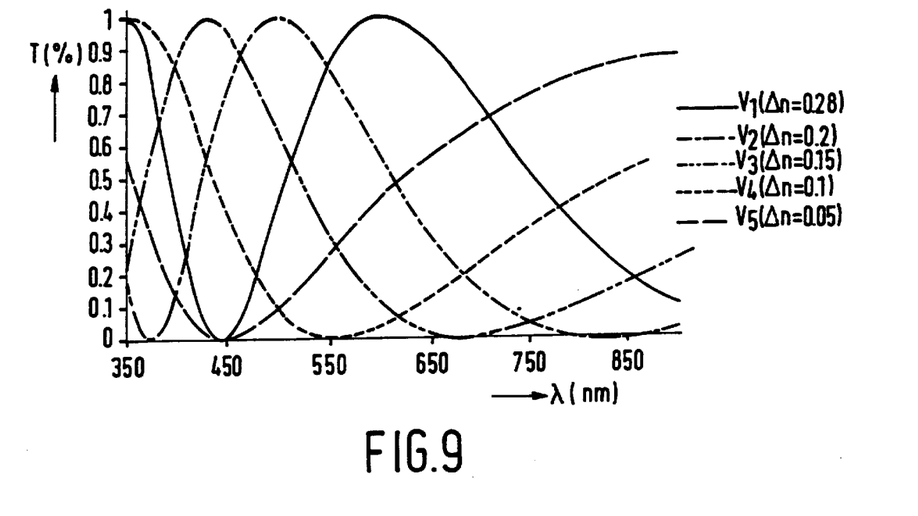
FIG. 9 shows transmission-wavelength curves for different voltages.

In this way $\Delta n = n$ (eff)–n in equation (1) can be changed as a function of the applied voltage V. FIG. 8 shows the calculated $\Delta n$ as a function of the wavelength $\lambda$, while in FIG. 9 the calculated transmitted intensity, i.e. the intensity of the zero order beam is plotted as a function of the wavelength for five different voltages V1, V2, V3, V4 and V5 with corresponding $\Delta n$ values of 0,28, 0,2, 0,15, 0,1 and 0,05 respectively. It can be seen that the transmitted intensity is highly wavelength dependent and that the spectrum of the transmitted, zero order, beam changes as a function of $n_e$ (eff) which is determined by the applied voltage. So, the colour of the transmitted beam can be controlled by varying the voltage applied to the electrodes 5, 6.

In the embodiment of FIG. 7 with two crossed grating structures 7, 8, it is ensured that the two polarization components of the incident beam 11 are diffracted if a voltage is applied so that the colour of the whole beam is controlled. In an embodiment wherein only one grating is present, only one polarization component of the beam 11 is colour controlled.

Figure 10:
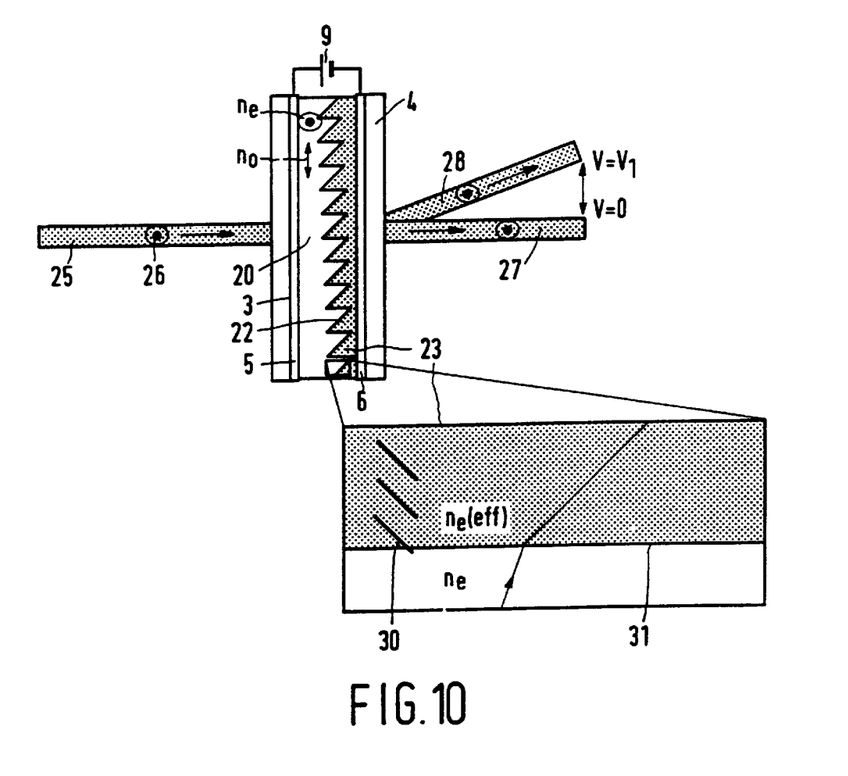
FIG. 10 shows a first embodiment of a beam direction control device according to the invention.

FIG. 10 shows an embodiment of a beam direction control device utilizing the present invention. This device comprises a first substrate layer 3, a first transparent electrode 5 and a layer 20 of anisotropic material having refractive indices $n_o$ and $n_e$. This layer has a saw tooth profiled surface 22. Between this surface and a second electrode 6, provided on a second substrate layer 4, a switchable electro-optic medium 23 is present. If no voltage is applied to the electrodes 5, 6, the molecules of the medium 23 are oriented parallel to the sawtooth facets, and there is no difference between the refractive indices of the medium 23 and the layer 20. An incident beam 25 will pass straightforward through the device and the exiting beam 27 has the same direction as the incident beam. If a voltage is applied to the electrodes 5,6 the molecules of the medium 23 are re-oriented and the directors 30 of this medium are at an angle $\alpha$ with respect to the sawtooth facets 31, as indicated in the lower part of FIG. 10, and the refractive index of the medium 23 for the extraordinary beam component becomes $n_e$ (eff) is given by $$n_{\textit{eff}} = \frac{n_o n_e}{(n_o^2 \sin^2\alpha + n_e^2 \cos^2\alpha)^{1/2}}$$

Due to the difference in refractive index of the layer 20 and the medium 23 for the extraordinary beam component the sawtooth profile is effective, which means that each of the facets, due to refraction, deflects part of the beam incident thereon at the same angle. The extraordinary component of the incident beam is now deflected and excites as beam 28.

In the embodiment of FIG. 10 only one of the polarization components of the incident beam is deflected. In order to change the direction of both components the embodiment shown in FIG. 11 can be used.

Figure 11:
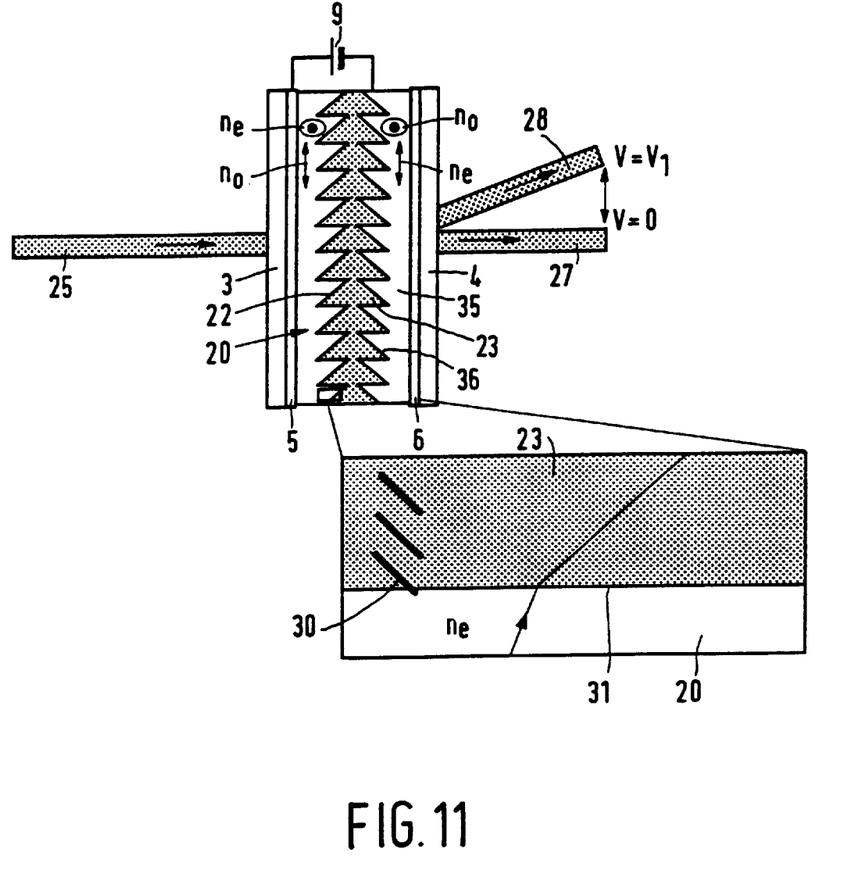
FIG. 11 shows a second embodiment of such device.

In this embodiment a second orientation layer 35 having a sawtooth profile 36, which is similar to, but mirror-inverted with respect to, the profile 22, is arranged on the second electrode 6. The electro-optical medium 23 between the two surfaces 22 and 36 has now the shape of a christmas tree. The extraordinary component of the incident beam 25 is, as in the embodiment of FIG. 10 deflected at the surface 22 if a voltage is applied. The ordinary component is now deflected at the same angle by the second sawtooth surface 36, because at this surface the ordinary component meets a refractive index difference, since the ordinary- and extraordinary refractive indices of layer 35 correspond to the extraordinary and ordinary refractive index respectively of the layer 22. If no voltage is applied to the device, both components pass undeflected through the device and exit as beam 27.

Figure 12:
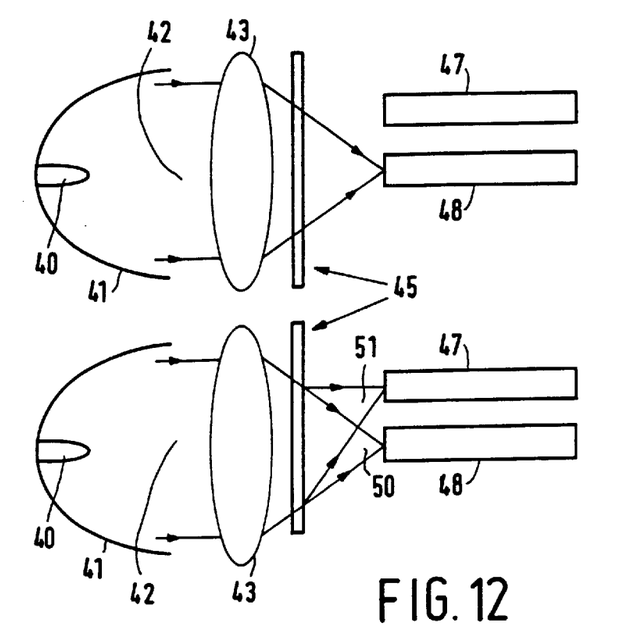
FIGS. 12 and 13 show schematically how the latter device can be used in optical systems.
Figure 13:
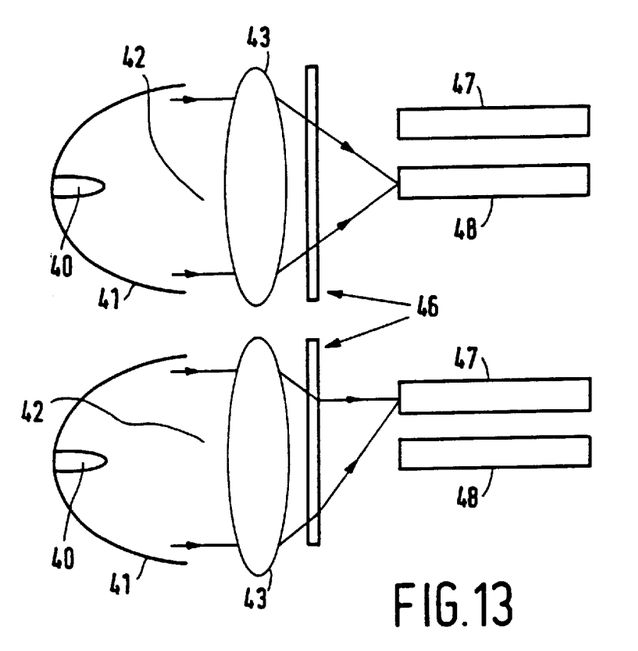

The devices shown in FIGS. 10 and 11 can be used in an arbitrary optical system to switch the energy of a beam between different channels or to distribute this energy over these channels. The channels may be formed by light guides, for example optical fibres. This application is schematically represented in FIGS. 12 and 13. in these FIGS. 40 is a radiation source, for example a lamp, and 41 a reflector which bundles the radiation into a beam, for example a collimated beam. This beam is concentrated by means of a lens—or mirror system 43, so that it can be further guided through an optical apparatus. The system further comprises a beam direction control device, 45 in FIG. 12 and 46 in FIG. 13, according to FIG. 10 and FIG. 11 respectively.

If no voltage is applied to the device, the whole beam 42 is concentrated on a first channel 48, as shown in the upper part of FIG. 12. If a voltage is applied, one of the polarization components 50 of the beam 42, for example the ordinary component passes undeflected through the device 45 and is incident on the channel 48. the extraordinary component is deflected by the device 45 and enters a second channel 47, as shown in the lower part of FIG. 12. in this way the energy of the beam 42 is divided over the two channels.

In the embodiment of FIG. 13, which comprises a device 46 according to FIG. 11, both polarization components are treated in the same way, i.e. they are both deflected towards the second channel 47 if a voltage is applied to the device 46, as shown in the lower part of FIG. 13, and both pass undeflected towards the first channel 48 if no voltage is applied, as shown in the upper part of FIG. 13.

The channels of FIGS. 12 and 13 may be fibre optic light guides. Such fibre optic system can be used, for example in car lighting. By switching from one channel to another the direction of the beam from the car light can be changed.

I claim:

1. A device for controlling a beam of electro-magnetic radiation, the device comprising two composed elements and an electro-optic medium between these elements, each of the elements successively comprising a substrate layer, an electrode layer and an orientation layer, each of the orientation layers facing the electro-optic medium and the electro-optic medium being switchable between at least two states, characterized in that at least one of the orientation layers has a linear periodic surface profile of alternating higher and lower strip-shaped surface portions and comprises a birefringent material having refractive indices which are substantially equal to those of the electro-optic medium in one of the states.

2. A device as claimed in claim 1, characterized in that the second orientation layer has a linear periodic surface profile of alternating higher and lower strip-shaped surface portions and comprises a birefringent material having refractive indices which are substantially equal to those of the electro-optic medium in said one of the states, and in that the length direction of the surface portions of the second orientation layer is substantially different from said length direction of the first orientation layer.

3. A device as claimed in claim 1, characterized in that the electro-optic medium is switchable between two states, one of which is substantially optically isotropic, and in that the refractive indices of the material of a profiled orientation layer are substantially equal to those of the electro-optical medium in the other state.

4. A device as claimed in claim 1, wherein both orientation layers have a linear periodic surface profile, characterized in that the electro-optic medium is a twisted nematic liquid crystal structure, and in that the length directions of the surface portions of the two orientation layers cross each other at an angle which is substantially equal to the twist angle of the twisted nematic liquid crystal structure.

5. A device as claimed in claim 1, characterized in that the electro-optic medium is switchable between at least two birefringent states, the refractive indices of the material of a profiled orientation layer being substantially equal to those of the electro-optic material in one of the birefringent states.

6. A device as claimed in claim 1, characterized in that the electro-optic medium comprises a ferro-electric, a ferrielectric or an electroclinic liquid crystal.

7. A device as claimed in claim 1, characterized in that a profiled orientation layer comprises an oriented polymer network which comprises a liquid crystal material.

8. A device as claimed in claim 1, characterized in that a surface profile is constituted by a phase diffraction grating and in that the electrode layers of the composed elements are connected to drive means.

9. A device as claimed in claim 8, characterized in that the period of the grating is at least 0.1 $\mu$m.

10. A device as claimed in claim 8 , characterized in that the period of the grating is most 100 $\mu$m.

11. A device as claimed in claim 8, characterized in that the drive means are constituted by a source of constant voltage and a switch.

12. An image display panel comprising a device as claimed in claim 8, characterized in that each of the electrode layers comprises a linear array of strip shaped electrodes for receiving image data- and selection voltages determining the transmissiveness of electro-optic medium portions defined by the electrode structures of the two electrode layers.

13. A direct view image display apparatus comprising an illumination unit, an image display panel and drive means for the panel, characterized in that the image display panel is a panel as claimed in claim 12.

14. A direct view image display apparatus as claimed in claim 13, characterized in that, at the viewer's side, at least a part of the grating has a variable period.

15. A direct view image display apparatus as claimed in claim 13, characterized in that, at the viewer's side at least a part of the grating has a Fresnel structure.

16. An image projection apparatus comprising, in this order, an illumination system, an image display panel, drive means for this panel and a projection lens, characterized in that the display panel is a panel as claimed in claim 12 and in that the projection lens is arranged in only the path of the zero order beam from the display panel.

17. A wavelength selection device characterized in that it comprises a device as claimed in claim 1, wherein a surface profile of an orientation layer is constituted by a phase diffraction grating and the electrode layers are connected to a controllable voltage source.

18. A wavelength selection device as claimed in claim 17, characterized in that it comprises two orientation layers with a linear periodic surface profile wherein the length direction of the surface portions of one layer is substantially perpendicular to that of the other layer.

19. A beam direction control device, characterized in that it comprises a device as claimed in claim 1, in that the surface profile is a sawtooth profile and in that the electrode layers are connected to a source of constant voltage via a switch.

20. A beam direction control device as claimed in claim 19, characterized in both orientation layers have a sawtooth profile.

* * * * *